United States Patent
Kim

(10) Patent No.: US 12,531,619 B2
(45) Date of Patent: Jan. 20, 2026

(54) METHOD AND DEVICE FOR DISCOVERY RESOURCE ALLOCATION IN WIRELESS COMMUNICATION SYSTEM

(71) Applicant: LG ELECTRONICS INC., Seoul (KR)

(72) Inventor: Young Dae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 415 days.

(21) Appl. No.: 18/021,550

(22) PCT Filed: Aug. 24, 2021

(86) PCT No.: PCT/KR2021/011243
§ 371 (c)(1),
(2) Date: Feb. 15, 2023

(87) PCT Pub. No.: WO2022/050618
PCT Pub. Date: Mar. 10, 2022

(65) Prior Publication Data
US 2023/0299838 A1    Sep. 21, 2023

(30) Foreign Application Priority Data

Sep. 2, 2020  (KR) .................. 10-2020-0111799

(51) Int. Cl.
*H04B 7/06*  (2006.01)
*H04W 8/00*  (2009.01)
*H04W 72/1263*  (2023.01)

(52) U.S. Cl.
CPC .......... *H04B 7/0695* (2013.01); *H04W 8/005* (2013.01); *H04W 72/1263* (2013.01)

(58) Field of Classification Search
CPC ..... H04W 92/18; H04W 72/25; H04W 72/02; H04W 4/40; H04W 76/14;
(Continued)

(56) References Cited

U.S. PATENT DOCUMENTS 11,265,872 B2 *   3/2022  Chae ..................... H04L 43/16
2009/0046653 A1   2/2009  Singh
(Continued)

FOREIGN PATENT DOCUMENTS

| KR | 1020190108121 | 9/2019 |
| WO | 2019078661 | 4/2019 |
| WO | 2020046062 | 3/2020 |

OTHER PUBLICATIONS

3rd Generation Partnership Project (3GPP), "Technical Specification Group Radio Access Network; Evolved Universal Terrestrial Radio Access (E-UTRA); Radio Resource Control (RRC); Protocol Specification (Release 16)," 3GPP TS 36.331 V16.1.1, Jul. 2020, 1080 pages.
(Continued)

*Primary Examiner* — Khalid W Shaheed
(74) *Attorney, Agent, or Firm* — LEE, HONG, DEGERMAN, KANG & WAIMEY

(57) ABSTRACT

A method of performing an initial beam configuration by a first terminal in a wireless communication system may comprise transmitting a discovery message based on a plurality of transmit beams in a first period of a discovery period, receiving a response message from a second terminal based on a plurality of receive beams in a second period of the discovery period, and performing beam alignment with the second terminal based on the response message. The plurality transmit beams and the plurality of receive beams may be mapped one-to-one.

13 Claims, 18 Drawing Sheets

(58) Field of Classification Search
CPC . H04W 72/0446; H04W 72/40; H04W 72/04; H04W 28/26; H04W 4/46; H04W 76/23; H04W 72/12
See application file for complete search history.

(56) References Cited

U.S. PATENT DOCUMENTS

| | | | | |
|---|---|---|---|---|
| 2015/0208384 A1* | 7/2015 | Baghel | ............ | H04W 8/005 |
| | | | | 455/450 |
| 2015/0215903 A1* | 7/2015 | Zhao | ............ | H04W 72/04 |
| | | | | 370/329 |
| 2016/0302249 A1* | 10/2016 | Sheng | ............ | H04W 4/70 |
| 2019/0159963 A1* | 5/2019 | Lurie | ............ | A61H 31/005 |
| 2020/0178159 A1* | 6/2020 | Wu | ............ | H04W 48/08 |

OTHER PUBLICATIONS

PCT International Application No. PCT/KR2021/011243, Written Opinion of the International Search Report dated Dec. 1, 2021, 4 pages.

* cited by examiner

METHOD AND DEVICE FOR DISCOVERY RESOURCE ALLOCATION IN WIRELESS COMMUNICATION SYSTEM

CROSS-REFERENCE TO RELATED APPLICATION(S)

This application is the National Stage filing under 35 U.S.C. 371 of International Application No. PCT/KR2021/011243, filed on Aug. 24, 2021, which claims the benefit of earlier filing date and right of priority to Korean Application No. 10-2020-0111799, filed on Sep. 2, 2020, the contents of which are all incorporated by reference herein in their entirety.

FIELD

The following description relates to a wireless communication system, and relates to a method and apparatus for allocating discovery resources in a wireless communication system.

In particular, it relates to a method and apparatus for allocating resources used when a terminal performs discovery in sidelink (SL) communication.

DESCRIPTION OF THE RELATED ART

A wireless communication system is a multiple access system that supports communication of multiple users by sharing available system resources (e.g., a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (mMTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure relates to a method and apparatus for allocating discovery resources in a wireless communication system.

The present disclosure relates to a method of configuring discovery resources for initial beam pairing between terminals in sidelink communication of a wireless communication system.

The present disclosure relates to a method of configuring transmit beams and receive beams to be mapped in consideration of a case where device-to-device (D2D) communication is performed through beamforming based on mmWave in sidelink communication of a wireless communication system.

The present disclosure relates to a method of allocating resources by sensing signals in sidelink communication of a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method of performing an initial beam configuration by a first terminal in a wireless communication system, the method comprising: transmitting a discovery message based on a plurality of transmit beams in a first period of a discovery period; receiving a response message from a second terminal based on a plurality of receive beams in a second period of the discovery period; and performing beam alignment with the second terminal based on the response message, wherein the plurality transmit beams and the plurality of receive beams are mapped one-to-one.

As an example of the present disclosure, a method of performing an initial beam configuration by a first terminal in a wireless communication system, the method comprising: receiving a discovery message based on a plurality of receive beams in a first period of a discovery period; transmitting a response message to a second terminal based on a plurality of transmit beams in a second period of the discovery period; and performing beam alignment with the second terminal based on the response message, wherein the plurality transmit beams and the plurality of receive beams are mapped one-to-one.

As an example of the present disclosure, a terminal for performing an initial beam configuration in a wireless communication system, the terminal comprising: a transceiver; and a processor connected to the transceiver, wherein the processor is configured to: transmit a discovery message through the transceiver based on a plurality of transmit beams in a first period of a discovery period; receive a response message from a second terminal through the transceiver based on a plurality of receive beams in a second period of the discovery period; and perform beam alignment with the second terminal based on the response message, wherein the plurality transmit beams and the plurality of receive beams are mapped one-to-one.

As an example of the present disclosure, a terminal for performing device-to-device (D2D) communication in a wireless communication system, the terminal comprising: a transceiver; and a processor connected to the transceiver, wherein the processor is configured to: receive a discovery message through the transceiver based on a plurality of receive beams in a first period of a discovery period; transmit a response message to a second terminal through the transceiver based on a plurality of transmit beams in a second period of the discovery period; and perform beam alignment with the second terminal based on the response message, wherein the plurality transmit beams and the plurality of receive beams are mapped one-to-one.

As an example of the present disclosure, an apparatus comprising at least one memory and at least one processor functionally connected to the at least one memory, wherein the at least one processor enables the apparatus to: transmit a discovery message based on a plurality of transmit beams in a first period of a discovery period; receive a response message from a second terminal based on a plurality of receive beams in a second period of the discovery period; and perform beam alignment with the second terminal based on the response message, wherein the plurality transmit beams and the plurality of receive beams are mapped one-to-one.

As an example of the present disclosure, a non-transitory computer-readable medium storing at least one instruction, the non-transitory computer-readable medium comprising the at least one instruction executable by a processor, wherein the at least one instruction enables an apparatus to: transmit a discovery message based on a plurality of transmit beams in a first period of a discovery period; receive a response message from a second terminal based on a plurality of receive beams in a second period of the discovery period; and perform beam alignment with the second terminal based on the response message, wherein the plurality transmit beams and the plurality of receive beams are mapped one-to-one.

In addition, the followings are applied in common.

As an example of the present disclosure, the first period and the second period are set to the same size, and a beam sweeping pattern of the plurality of transmit beams swept in the first period is set equal to that of the plurality of receive beams swept in the second period.

As an example of the present disclosure, a frequency resource of the response message received based on the plurality of receive beams is mapped and configured equally to a frequency resource of the discovery message transmitted based on the plurality of transmit beams.

As an example of the present disclosure, a mapping relationship between a frequency resource of the discovery message and a frequency resource of the response message is configured in advance.

As an example of the present disclosure, based on the mapping relationship between the frequency resource of the discovery message and the frequency resource of the response message being not configured in advance, the response message comprises information on the mapping relationship.

As an example of the present disclosure, at least one discovery period is repeatedly configured based on a preset period.

As an example of the present disclosure, the first terminal performs a discovery message transmission resource selection procedure before transmitting the discovery message.

As an example of the present disclosure, based on the first terminal performing the discovery message transmission resource selection procedure, the first terminal senses at least one or more response messages transmitted by another terminal in the second period of the discovery period before the discovery message transmission resource selection procedure, and selects the discovery message transmission resource from frequency resources other than a frequency resource corresponding to the sensed response message.

As an example of the present disclosure, transmission of the discovery message and reception of the response message are performed based on the same frequency resource within each discovery period.

As an example of the present disclosure, the first terminal senses a response message transmitted by another terminal based on another frequency resource in the second period of the discovery period, and selects a frequency resource used in a next discovery period based on the selected response message.

As an example of the present disclosure, the discovery period is determined based on at least one of sidelink frequency bandwidth, a frequency resource size of the discovery message, a frequency resource size of the response message, a maximum number of beams, a signal arrival distance of used mmWave, a service support distance or a maximum number of simultaneously supportable unicast connections.

The following effects may be obtained by embodiments based on the present disclosure.

According to the present disclosure, it is possible to provide a method and apparatus for allocating discovery resources in a wireless communication system.

According to the present disclosure, it is possible to configure discovery resources for initial beam pairing between terminals in sidelink communication of a wireless communication system.

According to the present disclosure, it is possible to provide a method of configuring transmit beams and receive beams to be mapped in consideration of a case where device-to-device (D2D) communication is performed through beamforming based on mmWave in sidelink communication of a wireless communication system.

According to the present disclosure, it is possible to provide a method of preventing resource collision by sensing signals and allocating resources in sidelink communication of a wireless communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure.

That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
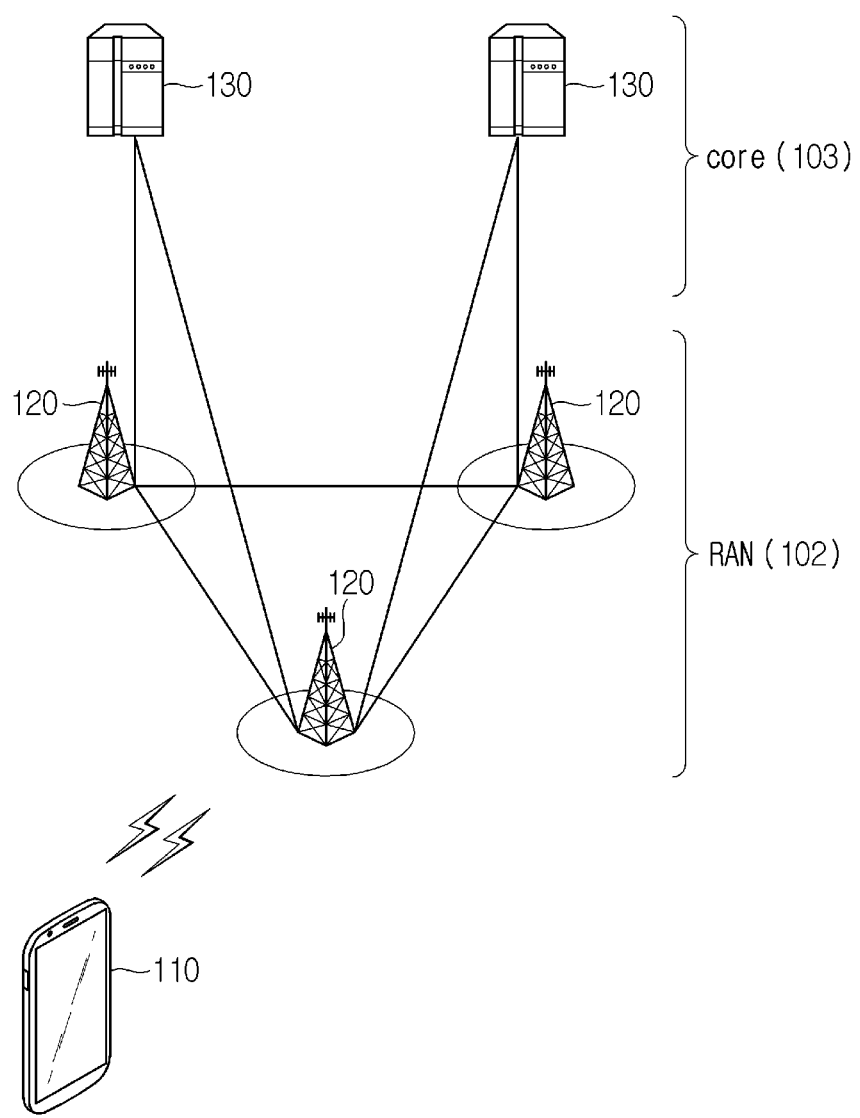
FIG. 1 illustrates a structure of a wireless communication system according to an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information"

In the following description, 'when, if, in case of' may be replaced with 'on the basis of/based on'.

A technical feature described individually in one figure in the present specification may be individually implemented, or may be simultaneously implemented.

In this specification, a higher layer parameter may be set for a terminal, set in advance, or predefined. For example, a base station or a network may transmit a higher layer parameter to a terminal. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, reference may be made to a wireless communication standard documents (3GPP TS36.XXX, 3GPP TS37.XXX and 3GPP TS38.XXX) published before this specification is filed. For example, the following document may be referred to.

Communication System to which the Present Disclosure is Applicable

FIG. 1 illustrates a structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The radio access network 102 includes a base station 120 that provides a control plane and a user plane to a terminal 110. The terminal 110 may be fixed or mobile, and may be called a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called a fixed station, a Node B, an eNB (eNode B), a gNB (gNode B), an ng-eNB, an advanced base station (ABS) or an access point, a base transceiver system (BTS), or an access point (AP). The core network 103 includes a core network entity 130. The core network entity 130 may be defined in various ways according to functions, and may be called other terms such as a core network node, a network node, and a network equipment.

Components of a system may be referred to differently according to an applied system standard. In the case of LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of a terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of 5G NR standard, the radio access network 102 may be referred to as NG-RAN, and the core network 103 may be referred to as 5GC (5G core). In this case, the core network 103 includes an access and mobility management function (AMF), a user plane function (UPF), and a session management function (SMF). The AMF provides a function for access and mobility management in units of terminals, the UPF performs a function of mutually transferring data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
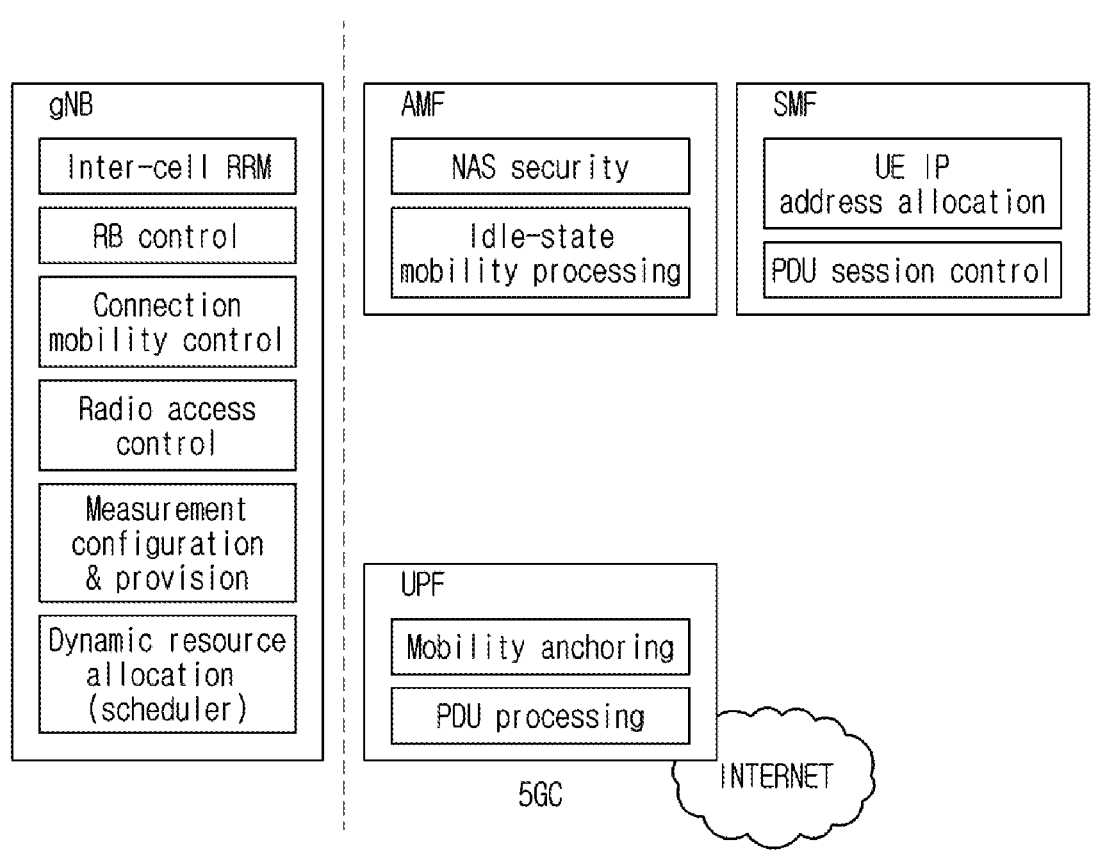
FIG. 2 illustrates a functional division between an NG-RAN and a 5GC applicable to the present disclosure.

FIG. 2 illustrates a functional division between an NG-RAN and a 5GC applicable to the present disclosure. The embodiment of FIG. 2 may be combined with various embodiments of the present disclosure.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer enable to exchange an RRC message between the UE and the BS.

V2X or Sidelink Communication

Figure 3A:
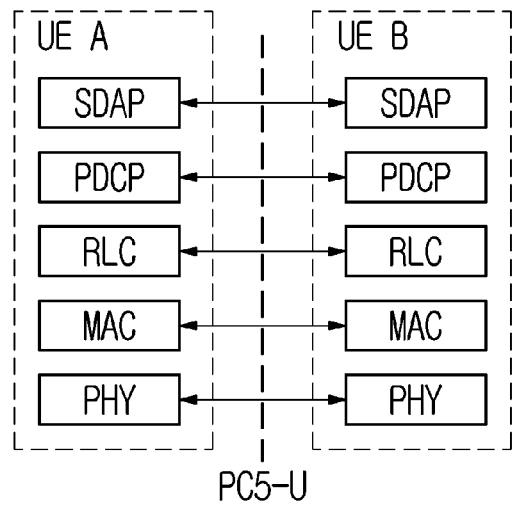
FIGS. 3A and 3B illustrate a radio protocol architecture applicable to the present disclosure.
Figure 3B:
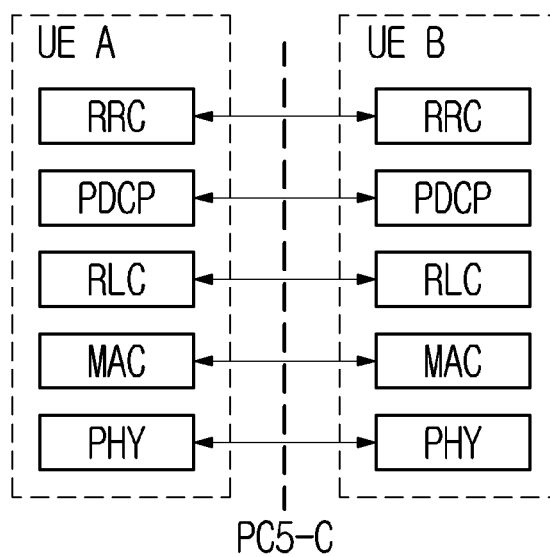

FIGS. 3A and 3B illustrate a radio protocol architecture applicable to the present disclosure. The embodiment of FIG. 3 may be combined with various embodiments of the present disclosure. Specifically, FIG. 3A exemplifies a radio protocol architecture for a user plane, and FIG. 3B exemplifies a radio protocol architecture for a control plane. The user plane corresponds to a protocol stack for user data transmission, and the control plane corresponds to a protocol stack for control signal transmission.

Sidelink Synchronization Signal (SLSS) and Synchronization Information

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization The S-PSS, S-SSS, and PSBCH may be included in a block format supporting periodic transmission (eg, SL SS (Synchronization Signal)/PSBCH block, hereinafter, S-SSB (Sidelink-Synchronization Signal Block). The S-SSB may have the same numerology (ie, SCS and CP length) as PSCCH (Physical Sidelink Control Channel)/PSSCH (Physical Sidelink Shared Channel) in the carrier, and the transmission bandwidth is (pre) set SL BWP (Sidelink BWP) For example, the bandwidth of the S-SSB may be 11 Resource Blocks (RBs). For example, the PSBCH may span 11 RBs. And, the frequency location of the S-SSB (in advance) can be configured Therefore, the UE does not need to perform hysteresis detection in frequency to discover the S-SSB in the carrier.

Synchronization Acquisition of SL Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 4:
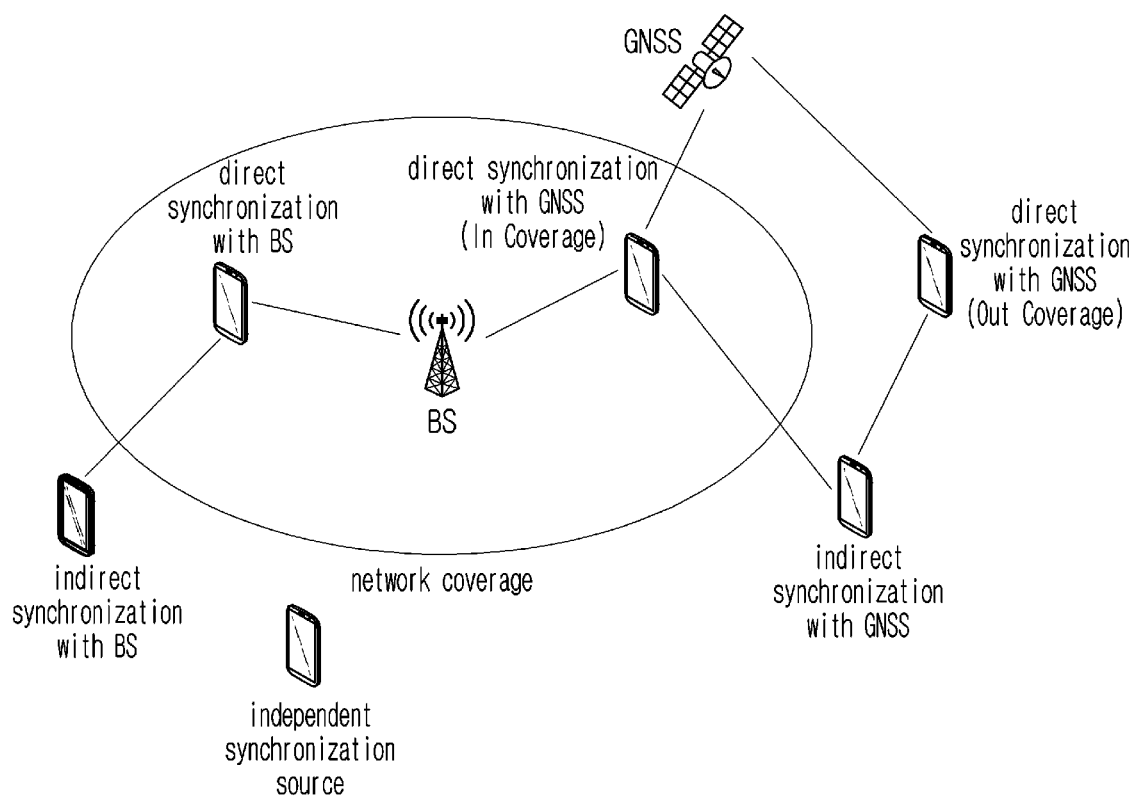
FIG. 4 illustrates a synchronization source or synchronization reference of V2X applicable to the present disclosure.

FIG. 4 illustrates a synchronization source or synchronization reference of V2X applicable to the present disclosure. The embodiment of FIG. 4 may be combined with various embodiments of the present disclosure.

Referring to FIG. 4, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 1] or [Table 2]. [Table 1] or [Table 2] is merely an example, and the relationship between synchronization sources and synchronization priorities may be defined in various manners.

TABLE 1

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 1] or [Table 2], P0 may represent a highest priority, and P6 may represent a lowest priority. In [Table 1] or [Table 32], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the terminal may (re)select a synchronization reference, and the terminal may obtain synchronization from the synchronization reference. In addition, the terminal may perform SL communication (e.g., PSCCH/PSSCH transmission/reception, Physical Sidelink Feedback Channel (PSFCH) transmission/reception, S-SSB transmission/reception, reference signal transmission/reception, etc.) based on the obtained synchronization.

Figure 5A:
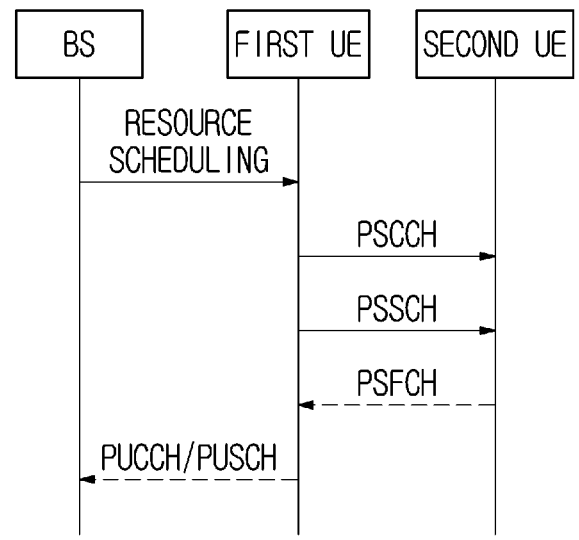
FIGS. 5A and 5B illustrate a procedure of performing V2X or SL communication by a terminal based on a transmission mode applicable to the present disclosure.
Figure 5B:
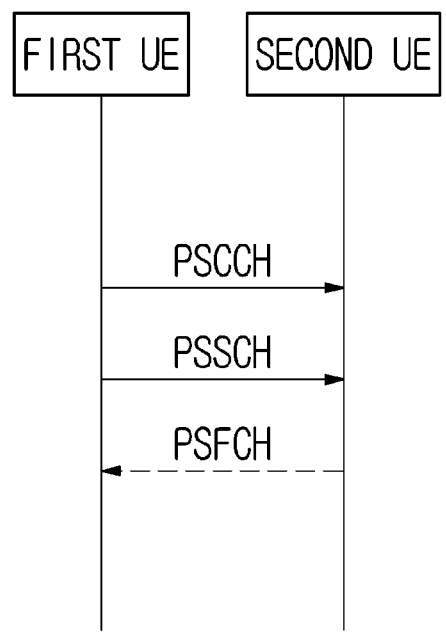

FIGS. 5A and 5B illustrate a procedure of performing V2X or SL communication by a terminal based on a transmission mode applicable to the present disclosure. The embodiment of FIGS. 9A and 9B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 5A exemplifies a UE operation related to an LTE transmission mode 1 or an LTE transmission mode 3. Alternatively, for example, FIG. 9B exemplifies a UE operation related to an NR resource allocation mode 1. For example, the LTE transmission mode 1 may be applied to general SL communication, and the LTE transmission mode 3 may be applied to V2X communication.

For example, FIG. 9B exemplifies a UE operation related to an LTE transmission mode 2 or an LTE transmission mode 4. Alternatively, for example, FIG. 9A exemplifies a UE operation related to an NR resource allocation mode 2.

Referring to FIG. 5A, in the LTE transmission mode 1, the LTE transmission mode 3, or the NR resource allocation mode 1, a BS may schedule an SL resource to be used by the UE for SL transmission. For example, the base station may transmit information related to SL resources and/or information related to UL resources to the first terminal. For example, the UL resources may include a PUCCH resource and/or a PUSCH resource. For example, the UL resources may be resources for reporting SL HARQ feedback to the base station.

For example, the first terminal may receive information related to a dynamic grant (DG) resource and/or information related to a configured grant (CG) resource from the base station. For example, the CG resource may include a CG type 1 resource or a CG type 2 resource. In this specification, the DG resource may be a resource configured/allocated by the base station to the first terminal through downlink control information (DCI). In this specification, the CG resource may be a (periodic) resource configured/allocated by the base station to the first terminal through DCI and/or RRC messages. For example, in the case of a CG type 1 resource, the base station may transmit an RRC message including information related to the CG resource to the first terminal. For example, in the case of a CG type 2 resource, the base station may transmit an RRC message including information related to the CG resource to the first terminal, and the base station may transmit DCI related to activation or release of the CG resource to the first terminal.

Subsequently, the first terminal may transmit a PSCCH (e.g., SCI (Sidelink Control Information) or 1st-stage SCI) to a second terminal based on the resource scheduling. Thereafter, the first terminal may transmit a PSSCH (e.g., 2nd-stage SCI, MAC PDU, data, etc.) related to the PSCCH to the second terminal. Thereafter, the first terminal may receive a PSFCH related to the PSCCH/PSSCH from the second terminal. For example, HARQ feedback information (e.g., NACK information or ACK information) may be received from the second terminal through the PSFCH. Thereafter, the first terminal may transmit/report HARQ feedback information to the base station through a PUCCH or PUSCH. For example, the HARQ feedback information reported to the base station may be information generated by the first terminal based on HARQ feedback information received from the second terminal. For example, the HARQ feedback information reported to the base station may be information generated by the first terminal based on a preset rule. For example, the DCI may be DCI for SL scheduling. For example, the format of the DCI may be DCI format 3_0 or DCI format 3_1. Referring to FIG. 9B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. For example, the first terminal that has selected a resource within the resource pool by itself may transmit a PSCCH (e.g., sidelink control information (SCI) or 1st-stage SCI) to the second terminal using the resource. Subsequently, the first terminal may transmit a PSSCH (e.g., 2nd-stage SCI, MAC PDU, data, etc.) related to the PSCCH to the second terminal. Thereafter, the first terminal may receive a PSFCH related to the PSCCH/PSSCH from the second terminal.

Referring to FIG. 5A or 5B, for example, the first terminal may transmit the SCI to the second terminal on the PSCCH. Alternatively, for example, the first terminal may transmit two consecutive SCIs (e.g., 2-stage SCI) to the second terminal on the PSCCH and/or the PSSCH. In this case, the second terminal may decode two consecutive SCIs (e.g., 2-stage SCI) to receive the PSSCH from the first terminal. In this specification, the SCI transmitted on the PSCCH may be referred to as 1st SCI, first SCI or 1st-stage SCI or 1st-stage SCI format, and SCI transmitted on the PSSCH is 2nd SCI, second SCI, 2nd-stage SCI or 2nd-stage SCI format. For example, the 1st-stage SCI format may include SCI format 1-A, and the 2nd-stage SCI format may include SCI format 2-A and/or SCI format 2-B. Referring to FIG. 9A or 9B, the first terminal may receive a PSFCH. For example, the first terminal and the second terminal may determine a PSFCH resource and the second terminal may transmit HARQ feedback to the first terminal using the PSFCH resource. In addition, referring to FIG. 9A, the first terminal may transmit SL HARQ feedback to the base station through a PUCCH and/or a PUSCH.

Figure 6A:
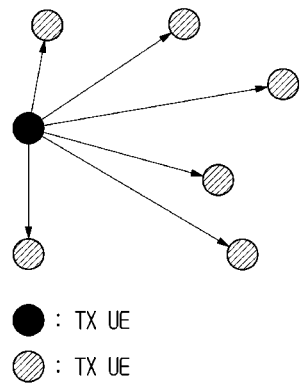
FIGS. 6A to 6C illustrate three cast types applicable to the present disclosure.
Figure 6B:
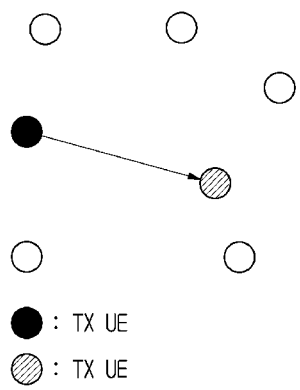
Figure 6C:
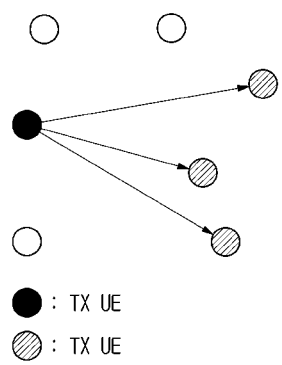

FIGS. 6A to 6C illustrate three cast types applicable to the present disclosure. The embodiment of FIGS. 6A to 6C may be combined with various embodiments of the present disclosure.

Specifically, FIG. 6A exemplifies broadcast-type SL communication, FIG. 6B exemplifies unicast type-SL communication, and FIG. 6C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (HARQ) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In this specification, HARQ-ACK may be referred to as ACK, ACK information or positive-ACK information, and HARQ-NACK may be referred to as NACK, NACK information or negative-ACK information.

SL Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Sidelink Congestion Control

For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 7:
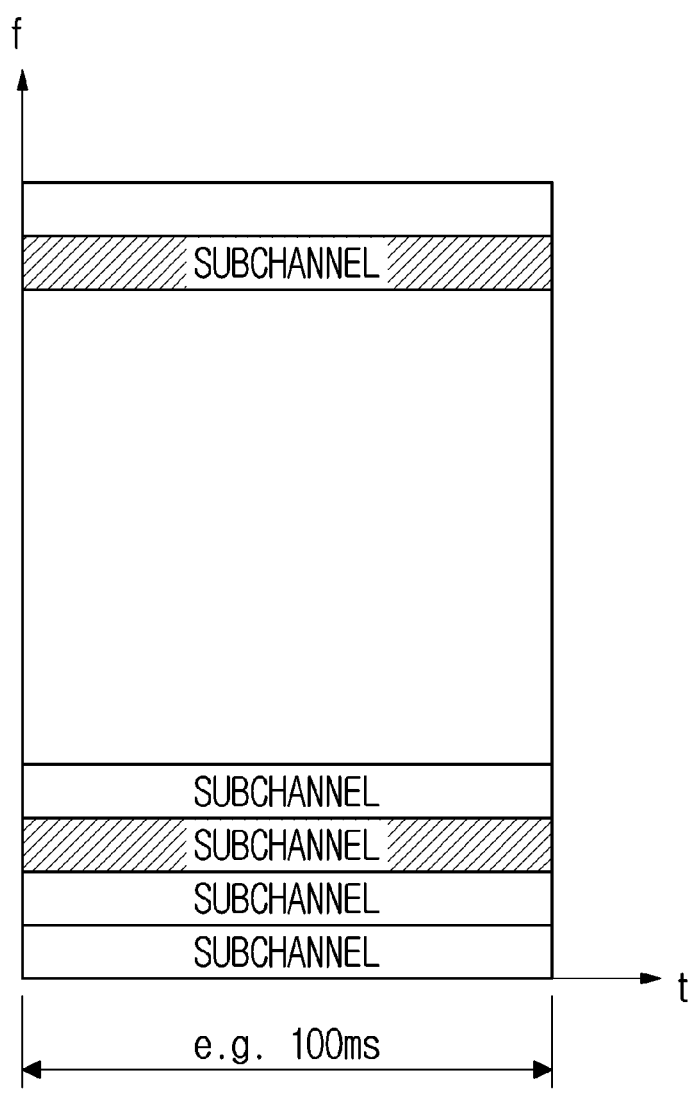
FIG. 7 illustrates resource units for CBR measurement applicable to the present disclosure.

FIG. 7 illustrates resource units for CBR measurement applicable to the present disclosure. The embodiment of FIG. 7 may be combined with various embodiments of the present disclosure.

Referring to FIG. 7, a CBR may refer to the number of subchannels of which the RS SI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 7, on the assumption that the hatched subchannels have values greater than or equal to a predetermined threshold, the CBR may refer to a ratio of hatched subchannels for a time period of 100 ms. In addition, the UE may report the CBR to the BS.

For example, when a PSCCH and a PSSCH are multiplexed in a frequency domain, the UE may perform one CBR measurement in one resource pool. When PSFCH resources are configured or preconfigured, the PSFCH resources may be excluded from the CBR measurement.

Further, there may be a need for performing congestion control in consideration of the priority of traffic (e.g., a packet). To this end, for example, the UE may measure a channel occupancy ratio (CR). Specifically, the UE may measure a CBR and determine a maximum value CRlimitk of a CR k (CRk) available for traffic corresponding to each priority (e.g., k) according to the CBR. For example, the UE may derive the maximum value CRlimitk of the channel occupancy ratio for the priority of traffic, based on a predetermined table of CBR measurements. For example, for relatively high-priority traffic, the UE may derive a relatively large maximum value of a channel occupancy ratio. Thereafter, the UE may perform congestion control by limiting the sum of the channel occupancy ratios of traffic with priorities k lower than i to a predetermined value or less. According to this method, a stricter channel occupancy ratio limit may be imposed on relatively low-priority traffic.

Besides, the UE may perform SL congestion control by using a scheme such as transmission power adjustment, packet dropping, determination as to whether to retransmit, and adjustment of a transmission RB size (MCS adjustment).

An example of SL CBR and SL RSSI is as follows. In the description below, a slot index may be based on a physical slot index.

SL CBR measured in a slot n is defined as portion of subchannels in which SL RSSI measured by a UE within a resource pool, sensed over CBR measurement window [n−a, n−1], exceeds a (pre)set threshold. Here, according to a higher layer parameter timeWindowSize-CBR, a is equal to 100 or 100·2μ slots. SL CBR may be applied to RRC_IDLE intra-frequency, RRC_IDLE inter-frequency, RRC_CONNECTED intra-frequency and RRC_CONNECTED inter-frequency.

SL RSSI is defined as a linear average of a total receive power ([W] unit) observed in a configured subchannel in OFDM symbols of a slot configured for a PSCCH and a PSSCH starting from a second OFDM symbol. For FR1, a reference point for SL RSSI shall be an antenna connector of a UE. For FR2, SL RSSI shall be measured based on a combined signal from antenna elements corresponding to a given receiver branch. For FR1 and FR2, if receive diversity is used by a UE, a reported SL RSSI value shall not be less than corresponding SL RSSI of any of individual receiver branches. SL RSSI may be applied to RRC_IDLE intra-frequency, RRC_IDLE inter-frequency, RRC_CONNECTED intra-frequency and RRC_CONNECTED inter-frequency.

An example of an SL CR (Channel occupancy Ratio) is as follows. The SL CR evaluated in a slot n is defined as dividing a total number of subchannels used for transmission in slot [n−a, n−1] and granted in slot [n, n+b] by a total number of subchannels configured in a transmission pool over slot [n−a, n+b]. SL CR may be applied to RRC_IDLE intra-frequency, RRC_IDLE inter-frequency, RRC_CONNECTED intra-frequency and RRC_CONNECTED inter-frequency. Here, a may be a positive integer and b may be 0 or a may be a positive integer. a and b is determined by UE implementation, and a+b+1=1000 or a+b+1=1000·2μ according to higher layer parameter timeWindowSize-CBR. b<(a+b+1)/2 and n+b shall not exceed a last transmission opportunity of a grant for current transmission. SL CR is evaluated for each (re)transmission. In evaluating SL CR, according to grant(s) present in slot [n+1, n+b] without packet dropping, a UE shall assume that a transmission parameter used in slot n is reused. A slot index may be a physical slot index. SL CR may be calculated per priority level. If it is a member of a sidelink grant defined in TS 38.321, the resource is treated as granted.

Specific Embodiments of the Present Disclosure

Beamforming could not be considered in V2X communication of an existing communication system (e.g., LTE system). On the other hand, in V2X communication of a new communication system (e.g., NR system), V2X communication considering beamforming may be performed. For example, communication in the mmWave band may be required for high-capacity data transmission in vehicle-related applications such as autonomous driving. In this case, when a signal is transmitted in the mmWave band, path loss for the signal may be large. Therefore, when communication is performed in the mmWave band, beamforming to compensate for high path loss may be required. To this end, in the new communication system, V2X communication may be performed based on beamforming in the mmWave band.

For example, when data transmission and reception are performed using beams in V2X communication, transmission efficiency can be increased by matching beams at the time of performing V2X communication. Therefore, mutual recognition may be performed between terminals performing V2X communication through beam alignment. For example, an operation of recognizing each other through beam alignment between terminals may be a discovery process (or step). For convenience of description, a method of allocating resources based on a discovery process will be described below. For example, terminals performing V2X communication may perform the above-described discovery process in an initial beam configuration process or a beam failure recovery process, and may not be limited to a specific embodiment.

In this case, as an example, when V2X communication is performed based on beamforming in the mmWave band, the terminal may determine a beam for data communication through beam sweeping in a discovery process. In this case, as an example, a corresponding resource may match the discovery signal of the determined beam in advance. That is, the terminal may perform V2X communication through a predetermined resource as a corresponding resource based on the determined beam. However, as an example, a terminal performing V2X communication may not perform communication only on another terminal. That is, V2X communication between terminals may be performed in an environment in which a plurality of terminals coexist.

In this case, for example, when each of a plurality of terminals transmits a discovery signal, a collision of discovery signals may occur in a terminal receiving the discovery signals, and thus, smooth communication may not be performed. That is, when a plurality of terminals transmit discovery signals at the same time in an environment where a plurality of terminals coexist, a method of preventing collision by differently allocating discovery signal resources may be required, which will be described below.

Figure 8:
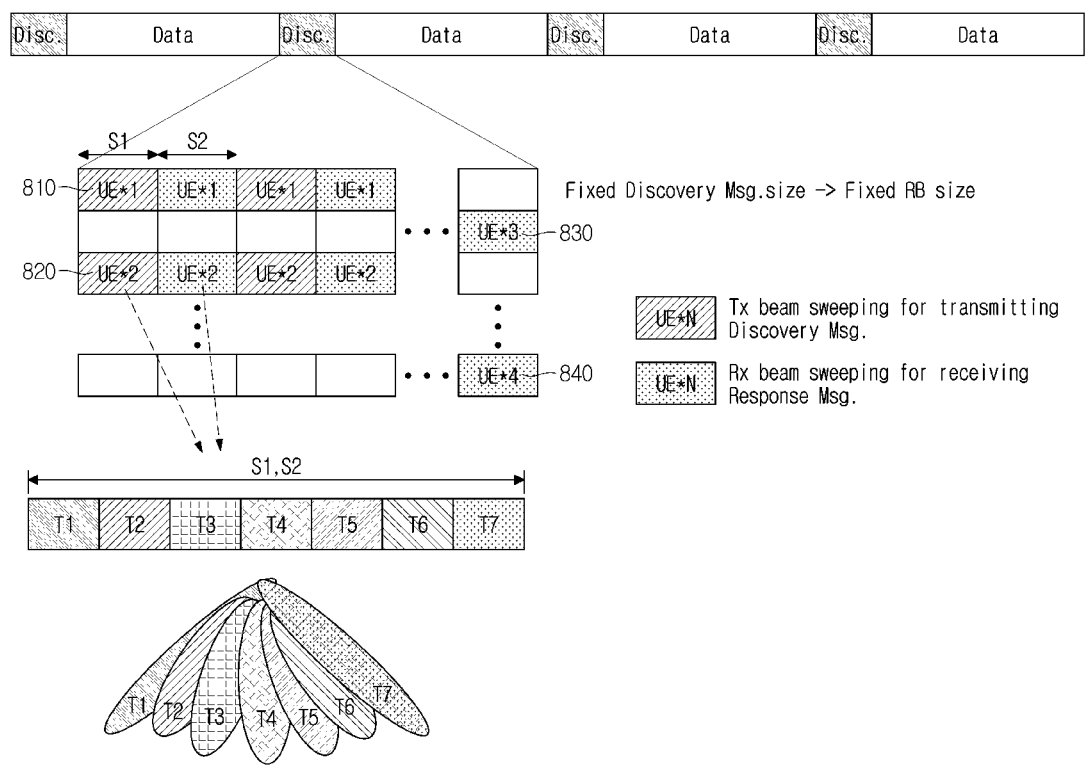
FIG. 8 is a diagram illustrating a method of setting a discovery message transmission period and a response message reception period in a discovery period according to an embodiment of the present disclosure.

As an example, FIG. 8 is a diagram illustrating a method of setting a discovery message transmission period and a response message reception period in a discovery period according to an embodiment of the present disclosure. Referring to FIG. 8, when performing V2X communication, data communication may be possible when transmission and reception times between a data reception terminal and a data transmission terminal coincide. However, since the reception terminal does not recognize the data transmission time point of the transmission terminal, it can perform communication by always attempting reception in all periods other than a transmission time point thereof. That is, the reception terminal may perform V2X communication by always attempting reception in a receivable period in which the reception terminal does not transmit data. At this time, in the existing communication system, V2X communication could be performed based on omnidirectional communication.

However, in the case of performing V2X communication through beamforming in the mmWave band, communication may not be performed if the beam directions are different even if the transmission and reception time points of the transmission terminal and the reception terminal coincide. That is, in V2X communication of the mmWave band, it is necessary to match beam directions as well as transmission/reception time points between terminals. For example, each terminal needs to recognize a counterpart terminal for V2X communication, and for this purpose, mutual alignment of transmission and reception beam directions may be required. Here, a process in which the transmission terminal and the reception terminal check the beam direction and perform beam alignment may be a discovery process. That is, the transmission terminal and the reception terminal may perform beam alignment in a specific step by considering the beam direction.

At this time, referring to FIG. 8, a terminal performing V2X communication may set a discovery period and a data transmission period.

For example, the discovery period and the data transmission period may be preset periods in a terminal performing V2X communication. As another example, information on the discovery period and the data transmission and reception period is indicated to a terminal performing V2X, and the terminal may set the discovery period and the data transmission and reception period based on the indicated information.

Here, as an example, as described above, the discovery period and the data transmission and reception period may be determined based on at least one of frequency bandwidth used for V2X communication, a frequency resource size of a discovery message or response message, a maximum number of utilized beams, and a signal arrival distance of used mmWave, a service support distance, or a maximum number of simultaneously supportable unicast connections.

As another example, the discovery period and the data transmission and reception period may be determined to be a certain period based on a slot or a subframe. As another example, the discovery period and the data transmission period may be set differently based on a subcarrier spacing (SCS), and are not limited to a specific embodiment.

Here, terminals performing V2X communication may perform initial beam paring in the discovery period. More specifically, when each terminal performs initial beam pairing, each terminal may repeatedly transmit a discovery signal (hereinafter, a discovery message) based on beam sweeping. Thereafter, the terminals, which have received the discovery signal, may transmit a response signal (hereinafter referred to as a response message) to complete initial beam pairing. Here, the discovery message may be repeatedly transmitted based on beam sweeping as described above. At this time, since the terminal that has transmitted the discovery message cannot recognize in which direction the response message will be received, beam sweeping may be performed to receive the response message. That is, the terminal may perform receive beam sweeping to receive the response message.

Here, as an example, beams for discovery message transmission and response message reception may have a one-to-one mapping relationship. In this case, the terminal transmitting the response message may transmit the response message at a time point corresponding to the discovery message reception time point based on the beam mapping relationship. As a more specific example, in FIG. 8, each of UE1 810 and UE2 820 may perform initial beam pairing in a discovery period. In this case, frequency resources respectively allocated to UE 1 810 and UE 2 820 may be different. That is, each of UE1 810 and UE2 820 may transmit a discovery message and receive a response message through a frequency resource allocated thereto in the discovery period. Here, a specific period S1 of the discovery period may be set as a period in which the discovery message is transmitted through beam sweeping. That is, each of UE1 810 and UE2 820 may transmit a discovery message by sweeping a beam during the S1 period. Thereafter, a specific period S2 of the discovery period may be set as a period in which a response message is received through beam sweeping. Here, a beam for discovery message transmission and a beam for response message reception may be mapped one-to-one. That is, when UE1 810 transmits a discovery message using a first directional beam in T1 in the S1 period, UE1 810 may receive a response message in T1 in the S2 period using the first directional beam. That is, beams may be mapped one-to-one, and discovery message transmission and response message reception may be performed in each period.

At this time, as an example, as described above, a discovery period and a data transmission/reception period may be repeatedly configured in the time domain for a terminal performing V2X communication. In addition, a plurality of discovery message transmission periods and response message reception periods may be configured to be mapped one-to-one within a discovery period. In this case, the terminal may repeatedly transmit the same discovery message through beam sweeping in each discovery message transmission period. In addition, the terminal that has transmitted the discovery message may receive the response message through the same time frequency resource with the same beam sweeping pattern in the response message reception period.

In this case, as an example, mapping between resources for discovery message transmission and resources for response message reception may be configured in advance. However, as an example, if mapping between resources for discovery message transmission and resources for response message reception cannot be configured in advance or is not recognized, the response message may include mapping relationship information. That is, the mapping relationship information may be indicated to the terminal, which has transmitted the discovery message, through the response message. At this time, as an example, the terminal, which has received the response message, may decode the response message and recognize a beam mapping pattern and a used frequency resource based on the mapping relationship information.

Figure 9:
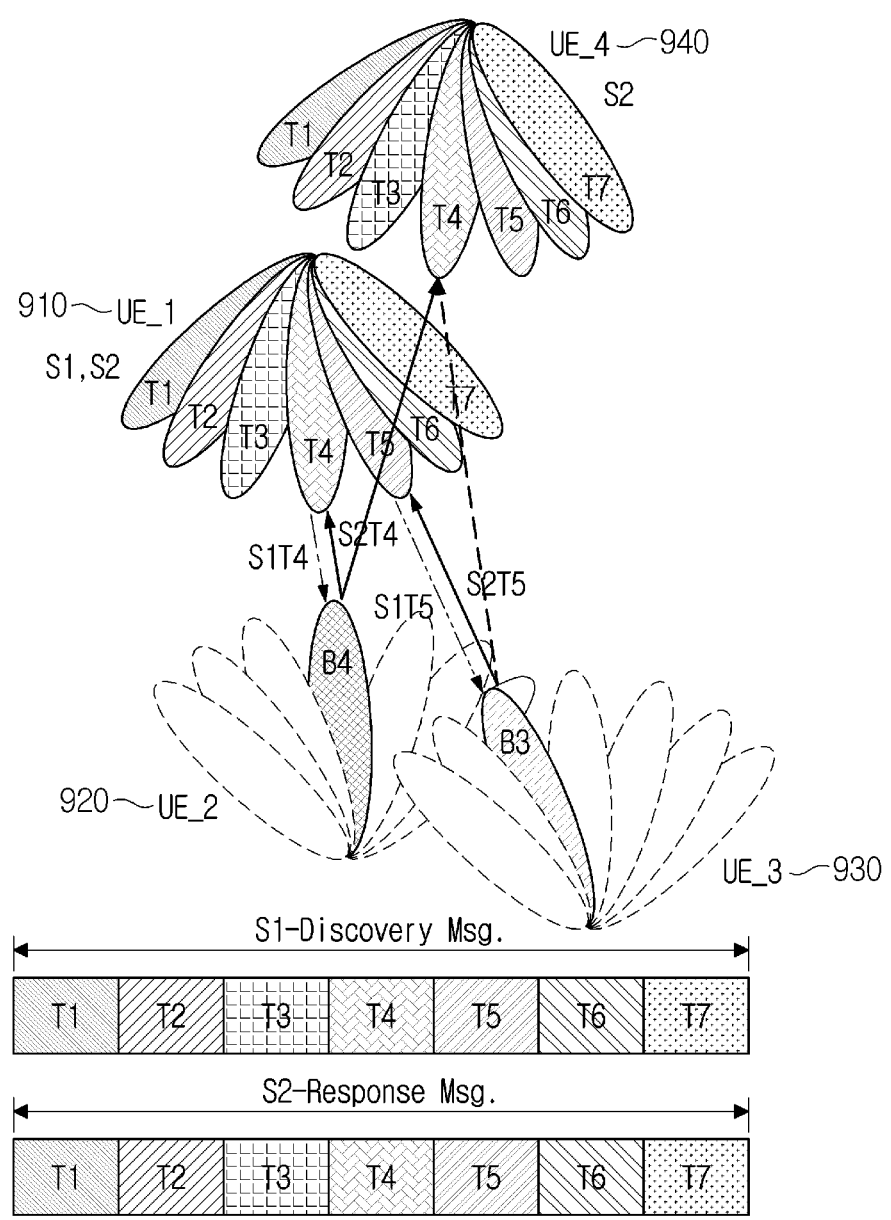
FIG. 9 is a diagram illustrating a method of performing initial beam pairing in an environment in which a plurality of terminals coexist according to an embodiment of the present disclosure.

Also, as an example, FIG. 9 is a diagram illustrating a method of performing initial beam pairing in an environment in which a plurality of terminals coexist according to an embodiment of the present disclosure. Referring to FIG. 9, UE1 910, UE2 920, UE3 930, and UE4 940 may transmit and receive data between each other based on V2X communication. At this time, as an example, UE1 910 may repeatedly transmit a discovery message through beam sweeping in a discovery period based on FIG. 8 described above. At this time, UE4 940 may be located in the same direction as UE1 910, and, when discovery message transmission of UE4 940 and discovery message transmission of UE1 910 are performed based on the same resource, mutual collision may occur. To this end, UE4 940 needs to select a discovery message transmission resource in consideration of discovery message transmission of UE1 910.

More specifically, when a terminal selects a transmission resource in V2X communication, the terminal may sense whether or not a data transmission signal of another terminal is present, and based on this, recognize the transmission resource being used by another terminal. Through this, the terminal performing V2X communication may minimize transmission resource collision. Here, in the existing V2X communication system, since signals are transmitted in all directions, the terminal was able to recognize the signal of another terminal. On the other hand, when V2X communication is performed based on beamforming in the mmWave band, it may not be easy to sense a signal transmitted by another terminal because the signal is transmitted in a specific beam direction. For example, in FIG. 9, when UE1 910 and UE4 940 are located in the same direction, each of UE1 910 and UE4 940 may repeatedly transmit a discovery message in a discovery period based on beam sweeping. At this time, the discovery message transmitted from UE1 910 to UE2 920 or UE3 930 may collide with the discovery message transmitted by UE4 940. For example, as described above, although UE4 940 may sense the signal transmitted by UE1 910 and exclude a transmission resource, since UE1 910 transmits a signal based on beamforming in the direction of UE2 920 or UE 930, UE4 940 may not sense the transmission signal of UE1 910. That is, UE4 940 cannot sense the signal of UE1 910 and a collision may occur.

Considering the foregoing, a beam for discovery message transmission and a beam for response message reception are mapped one-to-one, and based on this, a resource for signal transmission may be selected. For example, UE1 910 may transmit a discovery message based on beam sweeping in a discovery period. At this time, UE2 920 may receive Tx Beam #4 transmitted by UE1 910 at a time point S1_T4. Also, as an example, UE3 930 may receive Tx Beam #5 transmitted by UE1 910 at a time point S1_T5. However, this is only one example and may not be limited to the above-described embodiment. Here, UE2 920 may transmit a response message to UE1 910 in the beam direction in which the discovery message is received. That is, UE2 920 may transmit Rx Beam #4 to UE1 910 in the same direction as Tx Beam #4 at a time point S2_T4 in the S2 period. In addition, UE3 930 may also transmit Rx Beam #5 to UE1 910 in the same direction as Tx Beam #5 at a time point S2_T5 in the S2 period. At this time, UE1 910 may receive a response message transmitted by UE2 920 through Rx Beam #4 in the same direction as Tx Beam #4 at a time point S2_T4 in the S2 period. In addition, UE1 910 may receive a response message transmitted by UE3 930 through Rx Beam #5 in the same direction as Tx Beam #5 at a time point S2_T5 in the S2 period.

Here, UE4 940 may perform sensing in the period S2 in which other terminals transmit a response message, not in the period S1 in which discovery messages of other terminals are transmitted in order to select a discovery message transmission resource. That is, UE4 940 may detect a response message transmitted from UE2 920 at a time point S2_T4 within the S2 period through sensing. For example, UE4 940 may also perform sensing on a response message based on beam sweeping and may receive a response message based on a paired beam direction. That is, UE4 940 may sense the response message of UE2 920 based on the beam direction of Rx Beam #4 transmitted at the time point S2_T4, and may recognize that another terminal (i.e., UE1) in the same direction transmits a discovery message. Through this, UE4 940 may recognize that resource collision may occur.

For example, the response message transmitted by UE3 930 may be paired with a beam at the time point S2_T4 of UE4 940. However, since the response message transmitted by UE3 930 is transmitted at a time point S2_T5, UE4 940 forms another beam at the time point S2_T5, and thus may not be able to sense the response message transmitted from UE3 930. That is, in relation to UE3 930, UE4 940 may determine that there is no problem even if an arbitrary frequency resource is selected by applying the current time and beam without change. That is, when beams in different directions are transmitted at the same time, a collision problem may not occur even if the same resource is used.

Considering the above points, UE4 940 may perform resource selection for transmission of a discovery message. For example, UE4 940 may determine a discovery message (beam at the time point S2_T4) resource associated with the frequency resource detected in the response message sensing period S2. UE4 940 may select a resource other than the corresponding frequency resource because collision may occur in the corresponding frequency resource. Here, as an example, all terminals need to recognize the resource mapping relationship between the discovery message and the response message for the above-described operation. To this end, for example, the response message may include resource mapping relationship information. However, if other terminals decode the response message to obtain and apply the resource mapping relationship information, the resource mapping relationship may be recognized as described above, but if decoding is not performed, a problem may occur.

Considering the foregoing, the discovery message resource relationship may be determined in advance so that other terminals may recognize the resource mapping relationship without decoding the response message. For example, the discovery message resource relationship may be predetermined by a cell or determined through configuration in advance, and may not be limited to a specific embodiment. At this time, when the terminal senses the response message of another terminal in the response message reception period S2, it may be determined that a signal is present in a specific frequency domain based on the signal strength and other information. That is, the terminal may determine that the discovery message resource is being used by another terminal in the corresponding frequency resource.

More specifically, when UE4 940 detects a response message of another terminal at the time point S2_T4 and transmits a discovery message thereof, UE4 940 may select resources other than the corresponding resource and uses it in all transmission periods. That is, UE4 940 determines that UE1 910 is using the resource for transmission of a discovery message at the time point S2_T4, and may exclude the resource. At this time, UE4 940 may transmit the discovery message through other resources in all periods (T1 to T7) as the discovery message transmission period. For example, although UE4 940 senses a response message for one beam, since there is a possibility that other beams may be transmitted in a direction similar to that of UE1 910, the possibility of collision may be high. That is, when the same frequency resource is used for all beams, the terminal may prevent collision in advance by excluding the corresponding resource in the remaining periods even if sensing is performed on one beam. In this case, for example, if the beam sweeping direction is the same or similar, the possibility of collision may be high, and thus the above-described operation may be required.

Based on the foregoing, a terminal desiring to transmit a discovery message may check in which frequency domain a signal is present through sensing in a response message reception period. Thereafter, when selecting a resource for discovery message transmission, the terminal may perform selection except for the frequency domain mapped with the sensed signal.

In this case, for example, when the terminal senses the response message, the terminal may perform receive beam sweeping, as described above. Accordingly, the terminal may recognize that a response message is present in a direction corresponding to the receive beam, and may recognize that response message signals are present in multiple frequency regions for one beam. At this time, the terminal may exclude all frequency regions corresponding to the sensed response message in the discovery message resource selection process. Thereafter, the terminal may transmit a discovery message by selecting a specific frequency resource among the remaining frequency resources, and collision may be prevented through this.

At this time, as an example, based on the above, each terminal may use the same frequency resource at least within the discovery period (or cycle), and through this, may operate as described above.

Figure 10:
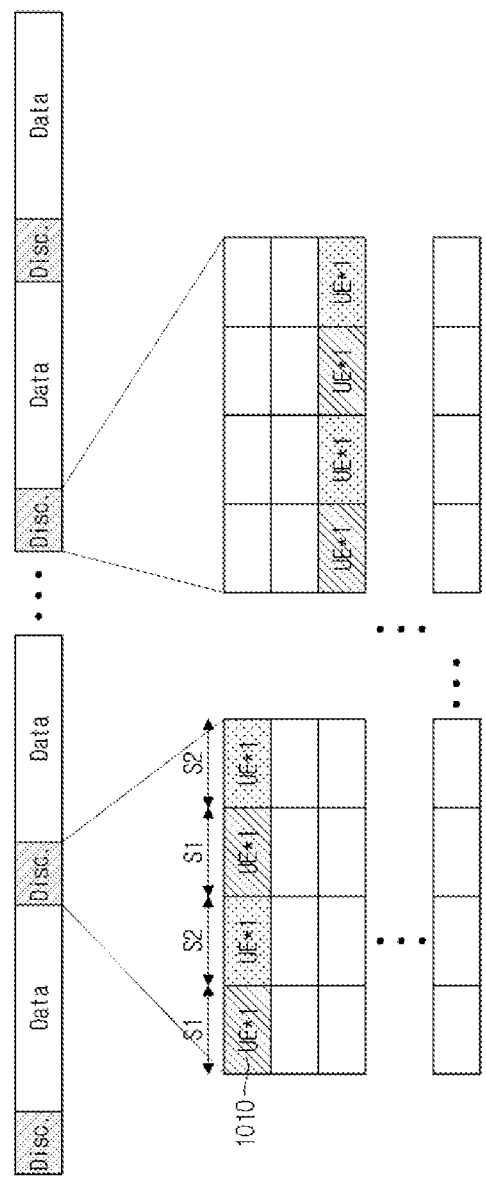
FIG. 10 is a diagram illustrating a method of transmitting a discovery message based on the same frequency resource in a discovery period according to an embodiment of the present disclosure.

Also, as an example, FIG. 10 is a diagram illustrating a method of transmitting a discovery message based on the same frequency resource in a discovery period according to an embodiment of the present disclosure. For example, referring to FIG. 10, UE1 1010 may select a specific frequency resource and transmit a discovery message. At this time, UE1 1010 may transmit a discovery message through the same resource within one discovery period (or cycle) D. Also, as an example, UE1 1010 may receive a response message for discovery message transmission through the above-described resource and simultaneously check whether a response message signal is present at another frequency. That is, UE1 1010 may sense the response message at another frequency. After that, UE1 1010 may determine whether to change discovery resources in a next discovery period (cycle) based on the sensing result.

That is, based on the foregoing, the discovery message transmission period and the response message reception period may be distinguished so that all terminals may recognize a region for sensing. At this time, the terminal may perform sensing for other frequency regions while receiving a response message for the corresponding frequency resource, so that resource allocation for V2X communication can be efficiently performed.

In this case, for example, when a terminal senses a response message for a plurality of terminals in an environment in which a plurality of terminals is present, many resources may be excluded based on sensing. Accordingly, when the terminal selects a resource for discovery message transmission based on resource exclusion, there may be insufficient resources to be selected. For example, whether resources are insufficient may be determined based on a certain period (e.g., one discovery period).

At this time, as an example, the terminal may change the beam sweeping order (or pattern). That is, the terminal may change the receive beam sweeping order applied to receive the response message and transmit the discovery message so that different times are allocated between the terminals in the same direction. As another example, the best available frequency resource may be selected for the discovery message transmission period S1, and another frequency resource may be selected for a partial collision time Ti. At this time, in order to select another frequency resource, the signal strength of each resource may be used through response message sensing at the corresponding time Ti. In addition, resource collisions can be prevented by applying all of the above-described methods, and are not limited to the above-described embodiments.

As described above, a terminal transmitting a discovery message may attempt to receive a response message in a corresponding frequency resource and simultaneously perform sensing for other resource regions. Here, as an example, even if the terminal does not transmit the discovery message, it may perform sensing in the response message reception period. At this time, based on the sensing result, the terminal may determine whether to maintain or change resources for discovery message transmission in the next discovery period as before, and is not limited to a specific embodiment.

As another example, if the terminal does not have a candidate resource for transmitting the discovery message based on response message sensing or is less than a preset value, the terminal may use other frequency resources only for a beam (or a corresponding time point) sensing the response message. As another example, as described above, the terminal may change the resource use time point by changing the beam sweeping pattern, which is as described above.

Figure 11:
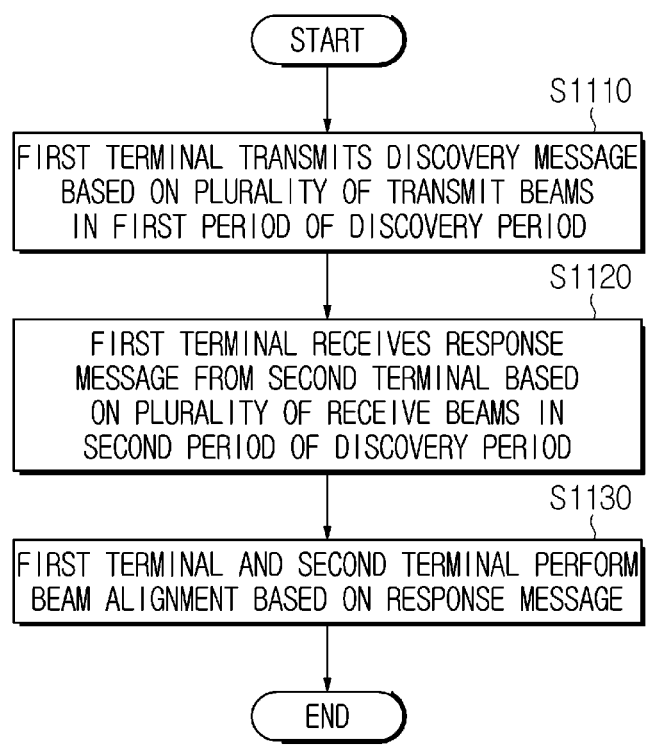
FIG. 11 is a flowchart illustrating a method of performing initial beam configuration by a terminal according to an embodiment of the present disclosure.

FIG. 11 is a flowchart illustrating a method of performing initial beam configuration by a terminal according to an embodiment of the present disclosure.

Referring to FIG. 11, a first terminal may perform an initial beam configuration. At this time, the first terminal may transmit a discovery message based on a plurality of transmit beams in a first period of a discovery period (S1110). At this time, the discovery period may be repeated based on a predetermined period, and may be set to a period having the same size. In this case, the first terminal may transmit a plurality of transmit beams in the first period based on sweeping. After that, the first terminal may receive a response message from a second terminal based on the plurality of receive beams in a second period of the discovery period (S1120). Thereafter, the first terminal and the second terminal may perform beam alignment based on the response message (S1130). For example, the second terminal may be a terminal that has received the discovery message transmitted by the first terminal. Here, the second terminal may transmit a response message to the first terminal through a beam corresponding to the beam receiving the discovery message from the first terminal. That is, a plurality of transmit beams transmitted by the first terminal and a plurality of receive beams through which the first terminal receives the response message may be mapped one-to-one. More specifically, in the discovery period, the first period in which the discovery message is transmitted and the second period in which the response message is received may be set to the same size. In this case, the beam sweeping pattern of the plurality of transmit beams swept in the first period may be set to be the same as the beam sweeping pattern of the plurality of receive beams swept in the second period. Also, as an example, a frequency resource of the response message received based on a plurality of receive beams may be mapped and configured equally to a frequency resource of a discovery message transmitted based on a plurality of transmit beams. That is, the same frequency resource may be used within one discovery period. As another example, a mapping relationship between a frequency resource of a discovery message and a frequency resource of a response message may be configured in advance. In this case, as an example, if a mapping relationship between the frequency resource of the discovery message and the frequency resource of the response message is not configured in advance, the response message may include information on the mapping relationship, as described above.

As another example, the first terminal may perform a discovery message transmission resource selection procedure before transmitting the discovery message. That is, the first terminal may determine resources to be used before transmitting the discovery message in the discovery period. In this case, when the first terminal performs a discovery message transmission resource selection procedure, the first terminal may sense at least one response message transmitted by another terminal in the second period of the discovery period before the discovery message transmission resource selection procedure. At this time, the first terminal may determine that a frequency resource corresponding to the sensed response message is used by another terminal, and may select a discovery message transmission resource excluding the corresponding frequency resource.

As another example, the first terminal may sense a response message transmitted by at least one other terminal based on a different frequency resource in the second period of the discovery period. That is, the first terminal may sense a response message transmitted through a different frequency resource as well as a response message received through the same frequency resource in the second period of the discovery period. At this time, the first terminal may select a frequency resource used in the next discovery period based on the sensed response message, as described above. As another example, the discovery period may be determined based on at least one of sidelink frequency bandwidth, a frequency resource size of a discovery message, a frequency resource size of a response message, a maximum number of beams, a signal arrival distance of used mmWave, a service support distance, or a maximum number of simultaneous supportable unicast connections, as described above.

Figure 12:
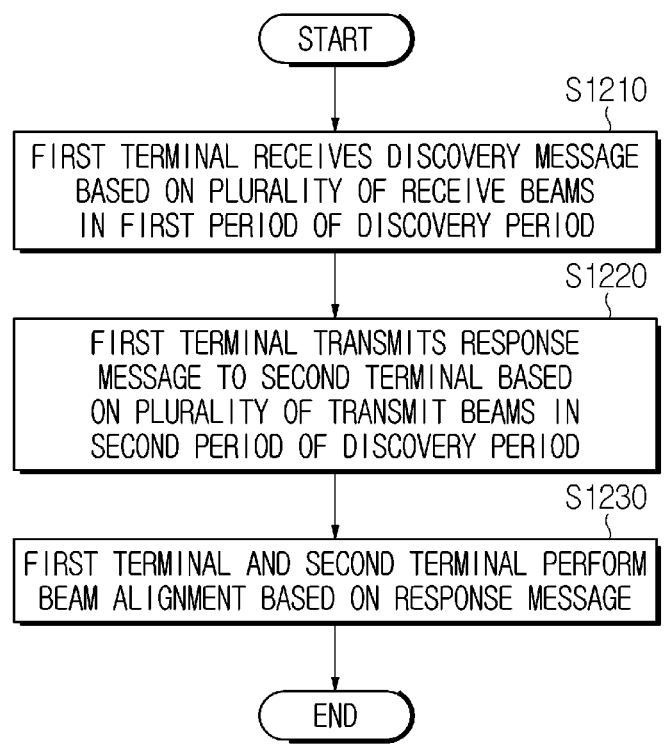
FIG. 12 is a flowchart illustrating a method of performing an initial beam configuration by a terminal according to an embodiment of the present disclosure.

FIG. 12 is a flowchart illustrating a method of performing an initial beam configuration by a terminal according to an embodiment of the present disclosure.

Referring to FIG. 12, a first terminal may receive a discovery message based on a plurality of receive beams in a first period of a discovery period (S1210). As an example, the first terminal may receive the discovery message based on beam sweeping. Then, based on the received discovery message, the first terminal may transmit a response message to a second terminal based on a plurality of transmit beams in a second period of the discovery period (S1220). That is, the first terminal may transmit the response message to the second terminal, which has transmitted the discovery message. In this case, the first terminal may transmit a response message to the second terminal through a beam corresponding to the beam receiving the discovery message. That is, a plurality of transmit beams and a plurality of receive beams may be mapped one-to-one. After that, the first terminal and the second terminal may perform beam alignment based on the response message (S1130). Through the above, the terminal, which has received the discovery message, may transmit a response message, through which the initial beam configuration may be performed. In this case, for example, in the discovery period, a first period in which the discovery message is transmitted and a second period in which the response message is received may be set to the same size. Also, as an example, a frequency resource of a response message received based on a plurality of receive beams may be mapped and configured equally to a frequency resource of a discovery message transmitted based on a plurality of transmit beams. That is, the same frequency resource may be used within one discovery period. As another example, a mapping relationship between a frequency resource of a discovery message and a frequency resource of a response message may be configured in advance. In this case, as an example, if a mapping relationship between the frequency resource of the discovery message and the frequency resource of the response message is not configured in advance, the response message may include information on the mapping relationship, as described above.

Systems and Various Devices to which Embodiments of the Present Disclosure are Applicable Various embodiments of the present disclosure may be mutually combined.

Hereinafter, an apparatus to which various embodiments of the present disclosure is applicable will be described. Although not limited thereto, various descriptions, functions, procedures, proposals, methods, and/or flowcharts disclosed herein may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 13:
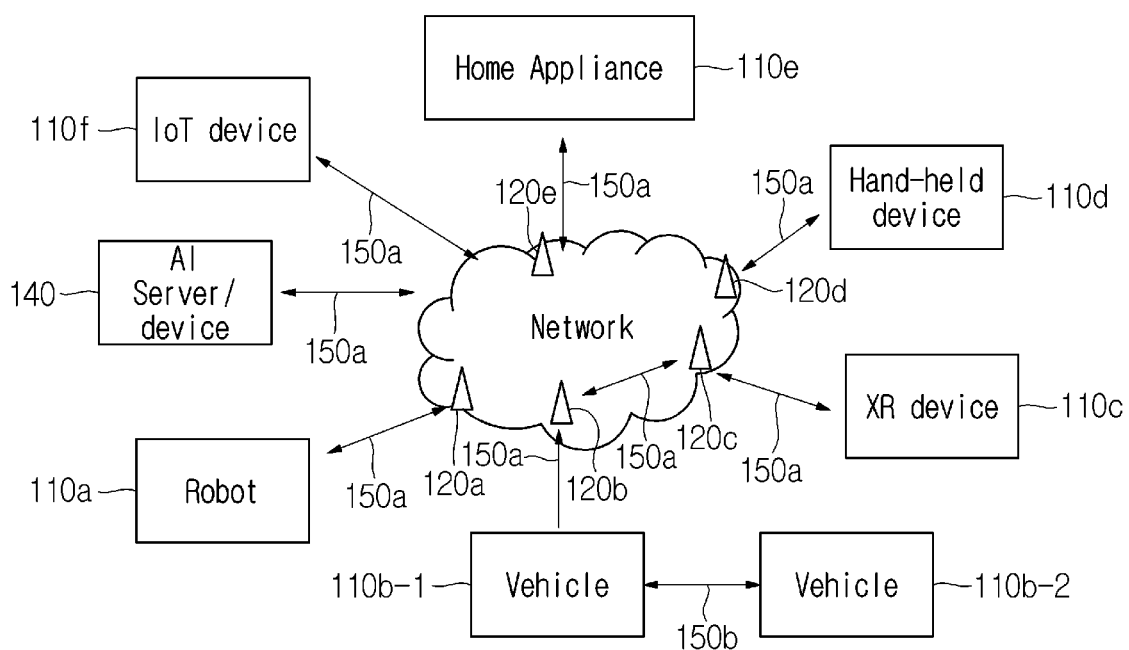
FIG. 13 illustrates a communication system according to an embodiment of the present disclosure.

FIG. 13 illustrates a communication system according to an embodiment of the present disclosure. The embodiment of FIG. 13 may be combined with various embodiments of the present disclosure.

Referring to FIG. 13, the communication system applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include at least one of a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120a to 120e network may be implemented by a wireless device, and a specific wireless device 120a may operate as a base station/network node for another wireless device.

Here, the wireless communication technology implemented in the wireless devices 110a to 110f of the present specification may include a narrowband Internet of Things for low-power communication as well as LTE, NR, and 6G. At this time, for example, NB-IoT technology may be an example of LPWAN (Low Power Wide Area Network) technology, may be implemented in standards such as LTE Cat NB1 and/or LTE Cat NB2, and is not limited to the above-described names. Additionally or alternatively, the wireless communication technology implemented in the wireless devices 110a to 110f of the present specification may perform communication based on LTE-M technology. In this case, as an example, the LTE-M technology may be an example of an LPWAN technology, and may be called by various names such as enhanced machine type communication (eMTC). For example, LTE-M technology may be implemented in at least one of 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 110a to 110f of the present specification may include at least one of ZigBee, Bluetooth, and Low Power Wide Area Network (LPWAN) in consideration of low power communication, and is not limited to the above-described names. For example, the ZigBee technology may create PAN (personal area networks) related to small/low-power digital communication based on various standards such as IEEE 802.15.4, and may be called by various names.

The wireless devices 100a to 100f may be connected to the network through the base station 120. AI technology is applicable to the wireless devices 100a to 100f, and the wireless devices 100a to 100f may be connected to the AI server 100g through the network. The network may be configured using a 3G network, a 4G (e.g., LTE) network or a 5G (e.g., NR) network, etc. The wireless devices 100a to 100f may communicate with each other through the base stations 120a to 120e or perform direct communication (e.g., sidelink communication) without through the base stations 120a to 120e. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base stations 120a to 120e and the base stations 120a to 120e/the base stations 120a to 120e. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Figure 14:
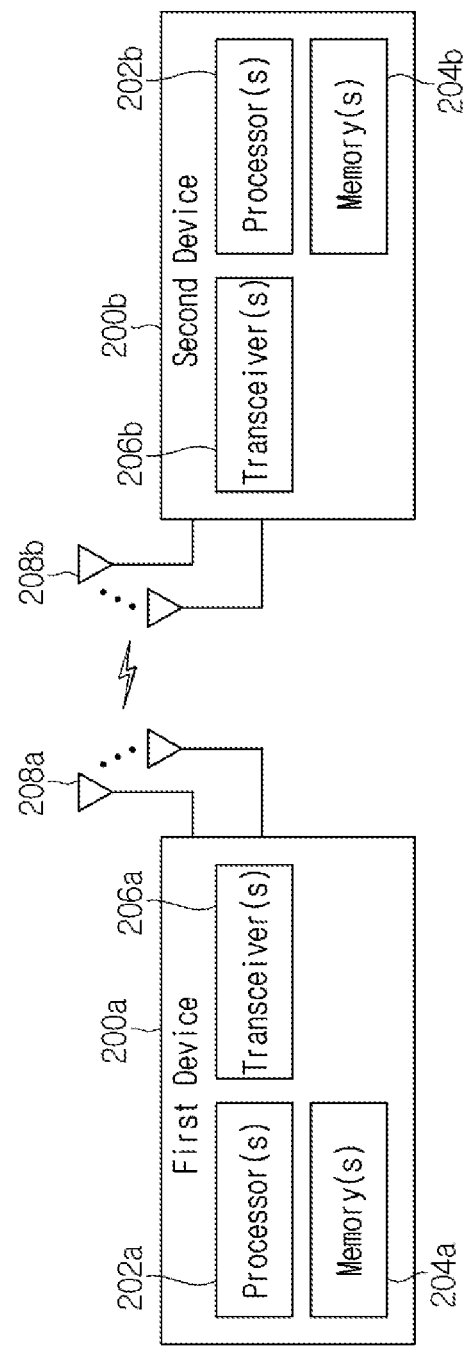
FIG. 14 illustrates a wireless device according to an embodiment of the present disclosure.

FIG. 14 illustrates a wireless device according to an embodiment of the present disclosure. The embodiment of FIG. 14 may be combined with various embodiments of the present disclosure.

Referring to FIG. 14, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may perform wireless communications with the first wireless device 200a and may include one or more processors 202b and one or more memories 204b and may further include one or more transceivers 206b and/or one or more antennas 208b. The functions of one or more processors 202b, one or more memories 204b, one or more transceivers 206b, and/or one or more antennas 208b may be similar to those of one or more processors 202a, one or more memories 204a, one or more transceivers 206a and/or one or more antennas 208a of the first wireless device 200a.

Figure 15:
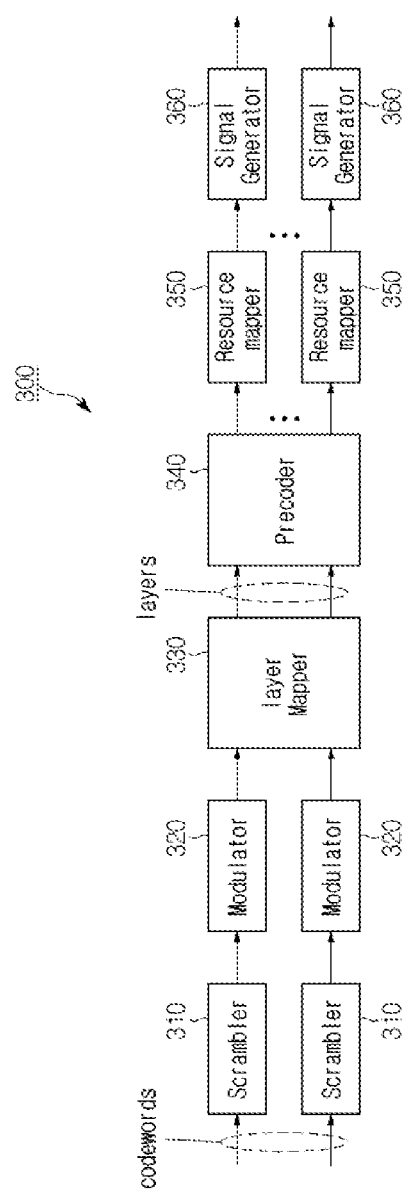
FIG. 15 illustrates a signal process circuit for a transmission signal applicable to the present disclosure.

FIG. 15 illustrates a signal process circuit for a transmission signal applicable to the present disclosure. The embodiment of FIG. 15 may be combined with various embodiments of the present disclosure.

Referring to FIG. 15, a signal processing circuit 300 may include scramblers 310, modulators 320, a layer mapper 330, a precoder 340, resource mappers 350, and signal generators 360. For example, an operation/function of FIG. 15 may be performed by the processors 202a and 202b and/or the transceivers 206a and 206b of FIG. 14. Hardware elements of FIG. 15 may be implemented by the processors 202a and 202b and/or the transceivers 36 and 206 of FIG. 14. For example, blocks 310 to 360 may be implemented by the processors 202a and 202b of FIG. 14. Alternatively, the blocks 310 to 350 may be implemented by the processors 202a and 202b of FIG. 14 and the block 360 may be implemented by the transceivers 206a and 206b of FIG. 14, and it is not limited to the above-described embodiment.

Figure 16:
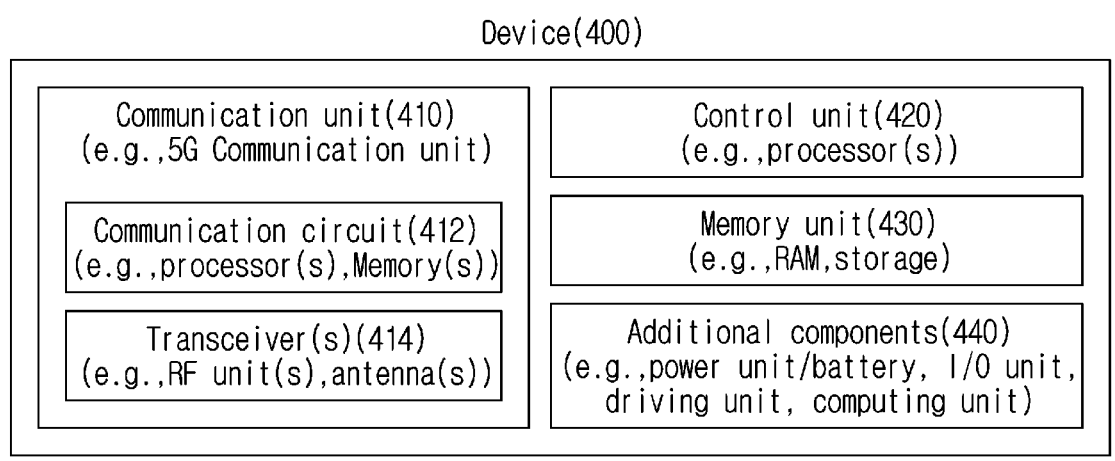
FIG. 16 shows another example of a wireless device according to an embodiment of the present disclosure.

FIG. 16 shows another example of a wireless device according to an embodiment of the present disclosure.

Referring to FIG. 16, a wireless device 300 corresponds to the wireless devices 200a and 200b of FIG. 14, and may include various elements, components, units/portions, and/or modules. For example, the wireless device 400 may include a communication unit 410, a control unit 420, a memory unit 430, and an additional component 440.

The communication unit 410 may include a communication circuit 412 and transceiver(s) 414. The communication unit 410 may transmit and receive signals (e.g., data, control signals, etc.) to and from other wireless devices and base stations. For example, the communication circuit 412 may include one or more processors 202a and 202b and/or one or more memories 204a and 204b of FIG. 14. For example, the transceiver(s) 414 may include one or more transceivers 206a and 206b and/or one or more antennas 208a and 208b of FIG. 14.

The control unit 420 may be composed of a set of one or more processors. For example, the control unit 420 may include a set of a communication control processor, an application processor (AP), an electronic control unit (ECU), a graphic processing processor, a memory control processor, and the like. The control unit 420 is electrically connected to the communication unit 410, the memory unit 430, and the additional component 440, and controls general operations of the wireless device. For example, the controller 420 may control electrical/mechanical operation of the wireless device based on the program/code/command/information stored in the memory unit 430. In addition, the control unit 420 may transmit the information stored in the memory unit 430 to the outside (e.g., another communication device) through the communication unit 410 through a wireless/wired interface, or store, in the memory unit 430, information received from the outside (e.g., another communication device) through the communication unit 410 through a wireless/wired interface.

The memory unit 430 may be composed of a RAM, a DRAM (dynamic RAM), a ROM, a flash memory, a volatile memory, a non-volatile memory and/or a combination thereof. The memory unit 430 may store data/parameters/programs/codes/commands necessary to drive the wireless device 400. Also, the memory unit 430 may store input/output data/information.

The additional component 440 may be variously configured according to the type of the wireless device. For example, the additional component 440 may include at least one of a power unit/battery, an input/output unit, a driving unit, and a computing unit. Although not limited thereto, the wireless device 400 may be implemented in the form of a robot (FIGS. 1, 110a), a vehicle (FIGS. 1, 110b-1 and 110b-2), an XR device (FIGS. 1, 110c), and a mobile device (FIGS. 1, 110d), home appliance (FIGS. 1, 110e), an IoT device (FIGS. 1, 110f), a digital broadcasting terminal, a hologram device, a public safety device, an MTC device, a medical device, a fintech device (or financial device), a security device, a climate/environment device, an AI server/device (FIGS. 1, 140), a base station (FIGS. 1, 120), and a network node. The wireless device may be mobile or used in a fixed location according to the use-example/service.

Figure 17:
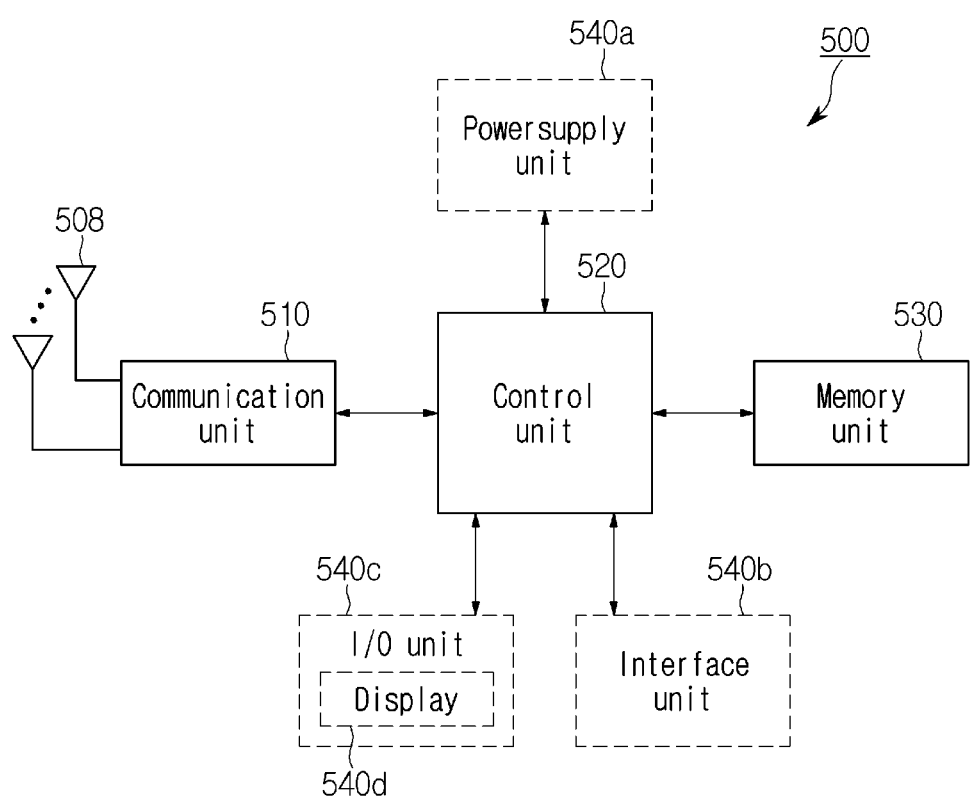
FIG. 17 illustrates a hand-held device applicable to the present disclosure.

FIG. 17 illustrates a hand-held device applicable to the present disclosure. FIG. 17 exemplifies a hand-held device applicable to the present disclosure. The hand-held device may include a smartphone, a smart pad, a wearable device (e.g., a smart watch or smart glasses), and a hand-held computer (e.g., a laptop, etc.).

Referring to FIG. 17, the hand-held device 500 may include an antenna unit (antenna) 508, a communication unit (transceiver) 510, a control unit (controller) 520, a memory unit (memory) 530, a power supply unit (power supply) 540a, an interface unit (interface) 540b, and an input/output unit 540c. An antenna unit (antenna) 508 may be part of the communication unit 510. The blocks 510 to 530/440a to 540c may correspond to the blocks 310 to 330/340 of FIG. 35, respectively, and duplicate descriptions are omitted.

The communication unit 510 may transmit and receive signals and the control unit 520 may control the hand-held device 500, and the memory unit 530 may store data and so on. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output video information/signals, audio information/signals, data and/or user input information. The input/output unit 540c may include a camera, a microphone, a user input unit, a display 540d, a speaker and/or a haptic module.

Figure 18:
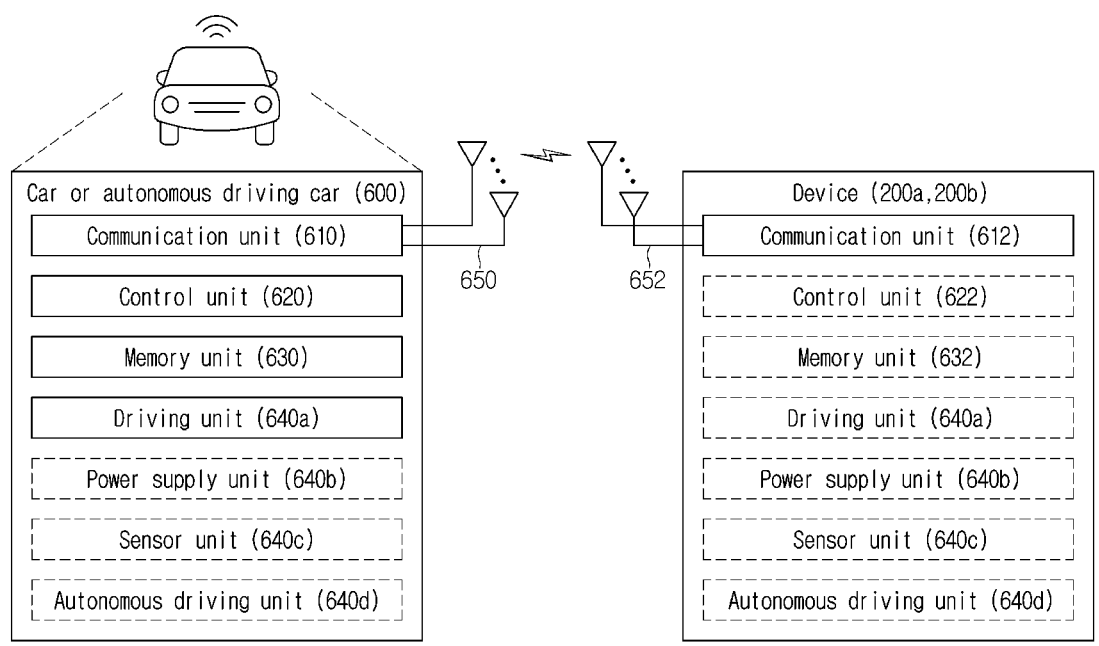
FIG. 18 illustrates a car or an autonomous vehicle applicable to the present disclosure.

FIG. 18 illustrates a car or an autonomous vehicle applicable to the present disclosure. FIG. 18 exemplifies a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited. The embodiment of FIG. 18 may be combined with various embodiments of the present disclosure.

Referring to FIG. 18, the car or autonomous driving car 600 may include an antenna unit (antenna) 608, a communication unit (transceiver) 610, a control unit (controller) 620, a driving unit 640a, a power supply unit (power supply) 640b, a sensor unit 640c, and an autonomous driving unit 640d. The antenna unit 650 may be configured as part of the communication unit 610. The blocks 610/630/640a to 640d correspond to the blocks 510/530/540 of FIG. 17, and duplicate descriptions are omitted.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

INDUSTRIAL AVAILABILITY

The embodiments of the present disclosure are applicable to various radio access systems. Examples of the various radio access systems include a $3^{rd}$ generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

The invention claimed is:

1. A method of performing an initial sidelink configuration by a first terminal in a wireless communication system, the method comprising: determining one or more resource pools, wherein the one or more resource pools are configured by a base station based on a sidelink resource allocation mode 1, or the one or more resource pools are determined by the first terminal based on a sidelink resource allocation mode 2, wherein a resource pool includes a plurality of contiguous frequency resources in a frequency domain, and a set of slots in a time domain, transmitting a discovery message based on a plurality of transmit sidelinks in a first period of a discovery period; receiving a response message from a second terminal based on a plurality of receive signals in a second period of the discovery period; performing synchronization with the second terminal based on the response message; and wherein the plurality transmit signals and the plurality of receive signals are mapped one-to-one.

2. The method of claim 1, wherein the first terminal performs beam alignment with the second terminal based on the synchronization, and
wherein the first period and the second period are set to the same size, and a beam sweeping pattern of the plurality of transmit signals swept in the first period is set equal to that of the plurality of receive signals swept in the second period.

3. The method of claim 1, wherein a frequency resource of the response message received based on the plurality of receive signals is mapped and configured equally to a frequency resource of the discovery message transmitted based on the plurality of transmit signals.

4. The method of claim 1, wherein a mapping relationship between a frequency resource of the discovery message and a frequency resource of the response message is configured in advance.

5. The method of claim 4, wherein, based on the mapping relationship between the frequency resource of the discovery message and the frequency resource of the response message being not configured in advance, the response message comprises information on the mapping relationship.

6. The method of claim 1, wherein at least one discovery period is repeatedly configured based on a preset period.

7. The method of claim 6, wherein the first terminal performs a discovery message transmission resource selection procedure before transmitting the discovery message.

8. The method of claim 7, wherein, based on the first terminal performing the discovery message transmission resource selection procedure, the first terminal senses at least one or more response messages transmitted by another terminal in the second period of the discovery period before the discovery message transmission resource selection procedure, and selects the discovery message transmission resource from frequency resources other than a frequency resource corresponding to the sensed response message.

9. The method of claim 6, wherein transmission of the discovery message and reception of the response message are performed based on the same frequency resource within each discovery period.

10. The method of claim 1, wherein the first terminal senses a response message transmitted by another terminal based on another frequency resource in the second period of the discovery period, and selects a frequency resource used in a next discovery period based on the selected response message.

11. The method of claim 1, wherein the discovery period is determined based on at least one of sidelink frequency bandwidth, a frequency resource size of the discovery message, a frequency resource size of the response message, a maximum number of beams, a signal arrival distance of used mmWave, a service support distance or a maximum number of simultaneously supportable unicast connections.

12. A terminal for performing an initial sidelink configuration in a wireless communication system, the terminal comprising: a transceiver; and a processor connected to the transceiver, wherein the processor is configured to: determine one or more resource pools, wherein the one or more resource pools are configured by a base station based on a sidelink resource allocation mode 1, or the one or more resource pools are determined by the first terminal based on a sidelink resource allocation mode 2, wherein a resource pool includes a plurality of contiguous frequency resources in a frequency domain, and a set of slots in a time domain, transmit a discovery message through the transceiver based on a plurality of transmit signals in a first period of a discovery period; receive a response message from a second terminal through the transceiver based on a plurality of receive signals in a second period of the discovery period; and perform synchronization with the second terminal based on the response message, wherein the plurality transmit signals and the plurality of receive signals are mapped one-to-one.

13. A terminal for performing an initial sidelink configuration in a wireless communication system, the terminal comprising: a transceiver; and a processor connected to the transceiver, wherein the processor is configured to: determine one or more resource pools, wherein the one or more resource pools are configured by a base station based on a sidelink resource allocation mode 1, or the one or more resource pools are determined by the first terminal based on a sidelink resource allocation mode 2, wherein a resource pool includes a plurality of contiguous frequency resources in a frequency domain, and a set of slots in a time domain; receive a discovery message through the transceiver based on a plurality of receive signals in a first period of a discovery period; transmit a response message to a second terminal through the transceiver based on a plurality of transmit signals in a second period of the discovery period; and perform synchronization with the second terminal based on the response message, wherein the plurality transmit signals and the plurality of receive signals are mapped one-to-one.

* * * * *